Figure 1:
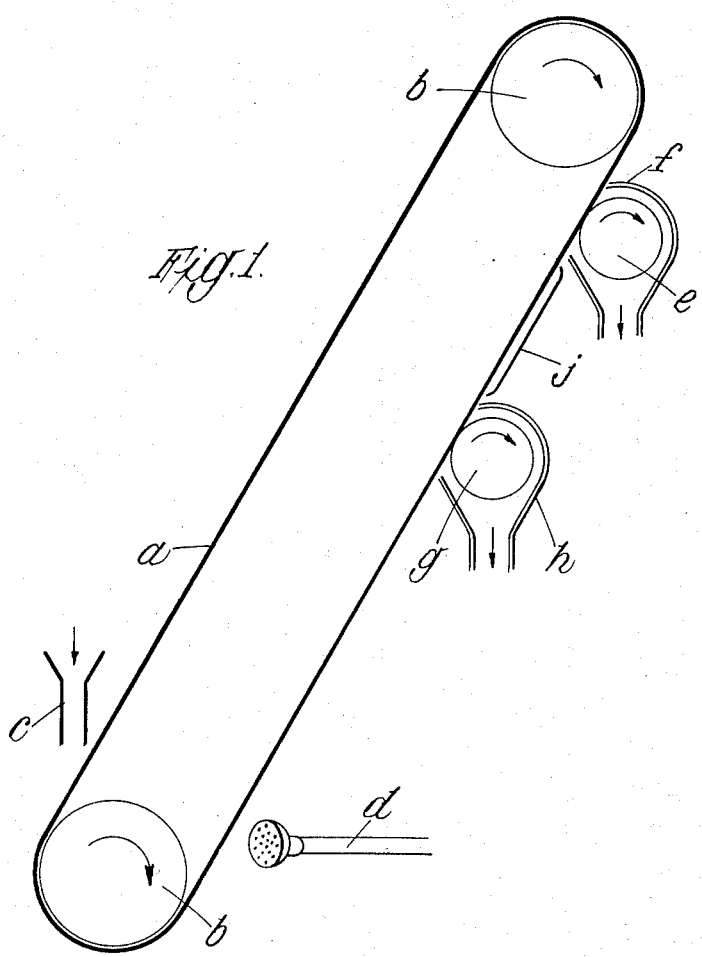

Aug. 26, 1952     C. R. JONES ET AL     2,608,297
PROCESS FOR RECOVERING OR SEPARATING VALUABLE
NUTRIENTS IN FLOUR MILLING

Filed May 9, 1947     2 SHEETS—SHEET 1

INVENTORS,
CHARLES ROBERT JONES
JOHN THOMLINSON
NORMAN LESLIE KENT,
by Thomas Ruhl, attorney

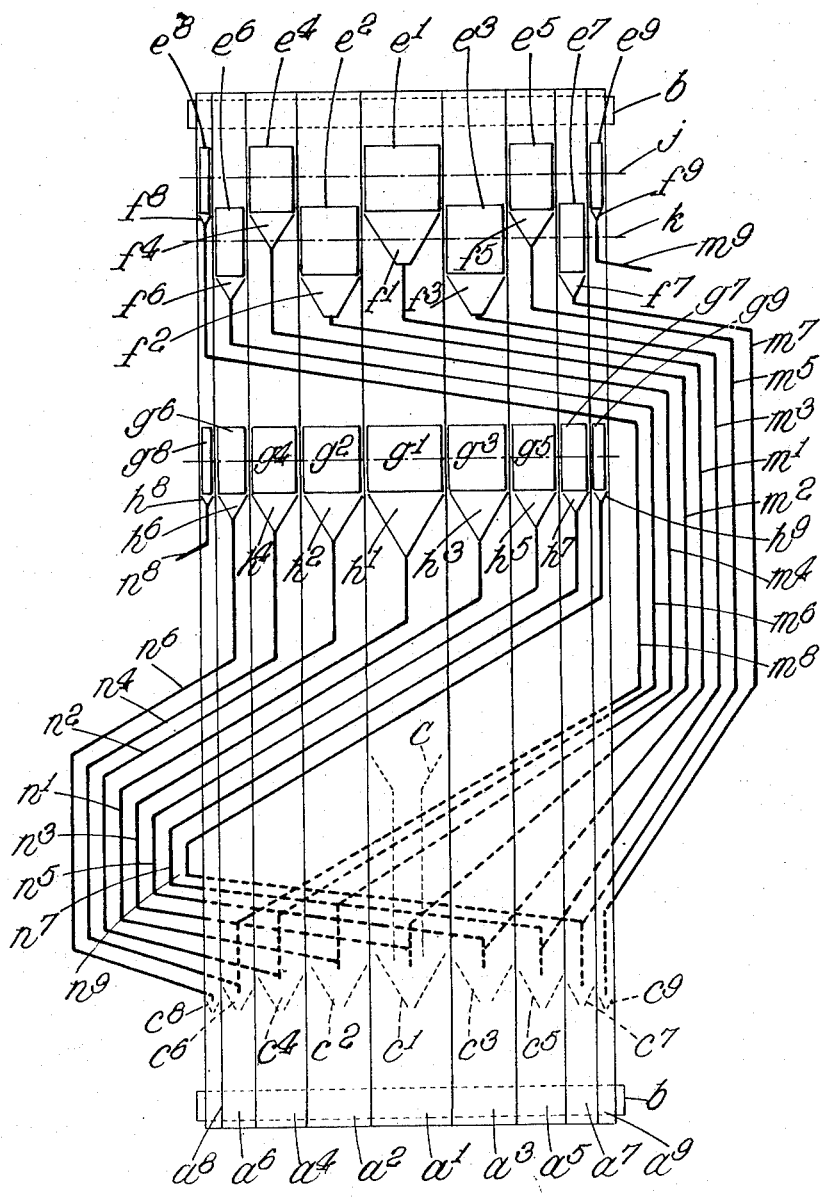

Patented Aug. 26, 1952

2,608,297

UNITED STATES PATENT OFFICE 2,608,297

PROCESS FOR RECOVERING OR SEPARATING VALUABLE NUTRIENTS IN FLOUR MILLING

Charles Robert Jones, John Thomlinson, and Norman Leslie Kent, St. Albans, England, assignors to The Research Association of British Flour-Millers, Surbiton, England, a company of Great Britain Application May 9, 1947, Serial No. 746,922

2 Claims. (Cl. 209—46)

Although germ may be regarded as a valuable nutrient to be recovered and bran may be regarded as the less valuable part which is to be separated from the germ, it does not necessarily follow that the invention is restricted thereto for in some instances, such as the production of semolina, the invention may be employed to improve the commercial value of the semolina by removing from it small proportions of germ, which may be used for other purposes. That is to say the invention may be employed for producing from a given starting material semolina which contains as much germ as possible or, on the other hand, a germ-free semolina, according to requirements.

Again, the invention may be employed for excluding as far as possible, germ from flour in a case where the germ has technically (not nutritionally) undesirable enzymatic properties because it is derived from sprouted grain. Sometimes, especially in wet countries, some of the native wheat may have sprouted by the time it reaches the millers and the flour ground therefrom will not bake into a good loaf owing to the presence of particular enzymes, which it is believed become abundant in the germ when sprouting commences and the present invention may be employed, with advantage, to treat the semolina, which in this case would be an intermediate product in the course of flour milling.

Compatibility with the known practice a mixture of particles of germ and bran, of germ and endosperm, or of endosperm, germ and bran is brought into contact with a lightly moistened surface after which the adherent particles are removed therefrom selectively. For example, the mixture may be allowed to fall or impinge upon the moistened surface. Owing to difference in properties the respective particles tend to stick to the moistened surface with different tenacities, while some may not adhere at all. Endosperm particles tend to fall off whilst bran particles tend to be removed more readily then the germ on inverting the surface and tapping or agitating it, on lightly brushing it or on causing a sufficiently strong current of air (preferably warmed) to impinge upon it. The particles which resist such treatment may be brushed or scraped off subsequently and be collected separately.

If the mixture under consideration be separated into two parts in this way, the more readily dislodged part (which may be called the "reject") is more branny and less rich in germ than that less readily removed (called the "choice").

In accordance with the present invention separation by bringing the starting material into contact with a slightly moistened surface and removing the adherent particles therefrom selectively, in the known manner, is carried out stage by stage on multiple apparatus in which constituents of the starting material selectively separated by one component of the multiple apparatus are mixed with constituents selectively separated by two other components, respectively, and are transferred to two further components.

It is to be understood that the use of the term "constituents" in the expression "constituents of the starting material selectively separated by one component of the multiple apparatus" is intended to indicate that the starting material would be reconstituted if the two so-called constituents were mixed with one another; it is not intended to mean that the starting material fed to a component is selectively separated into the two ultimate constituents which it is desired to obtain from the apparatus, but that there is a partial separation only, each of the so-called constituents, when mixed with a so-called constituent from another component, constituting another starting material which is capable of further separation and so on in further components of the apparatus before the ultimate constituents are obtained.

It is also to be understood that the expression "selectively separated" is intended to indicate that one of the so-called constituents is less adherent to the slightly moistened surface than is the other so-called constituent.

In this way some of the intermediate material recirculates, but there is a continuous output of the respective "pure" components at either end of the system, equal in combined amount to that of the original feed and corresponding in proportions with the composition of the mixture being fed to the system.

At any stage the process may be effected by means of a horizontal revolving hollow cylinder, to either the inside or outside surface of which moisture is applied suitably, e. g. by sprays, or by revolving rollers or series of rollers wetted by suitable means such as wick feed or partial immersion in a trough carrying water or other solution or liquid which it may be desired to employ. At a predetermined position after leaving the moistening device each part of the moving surface of the cylinder is charged with a uniformly spread layer of mixture, preferably not more than one particle thick, from a feed roll, vibrated sieve or other suitable device. After remaining in contact therewith until the part of the surface is moving downwards the layer of mixture is then subjected to vibration or rapid tapping from outside or inside the cylinder, or it may be lightly brushed by a soft rotary brush or other gentle means of dislodgment.

The material so dislodged, which is the "reject," is collected in a suitably placed trough which may contain a conveyor for removal purposes. After further travel of the part of the surface of the cylinder the material still remaining attached, which is the "choice," is removed by further brushing or scraping, and collected.

Alternatively, the smooth surface of a suitably inclined continuous travelling band may be employed instead of that of a cylinder, similar means of moistening, and introduction and removal of particles, being employed at appropriate positions in the travel of the band. Such a band, or a plurality of such bands, arranged with the uppermost inclined surface travelling upwards, may be conveniently disposed to effect the multi-stage process described, the material fed towards the bottom of any band, or portion of a band, being removed in two stages as described (or if desired in more than two stages) at a higher position in the travel of the band. In this way the band acts also as an elevator and the material dislodged at any stage may be allowed to flow by gravity to appropriate points for retreatment.

The moisture of the surface of the cylinder or travelling band may be effected by means of a fine spray of water or other liquid, a steam jet or a current of highly humid air. Alternatively the surface may be cooled suddenly as it moves through a humid atmosphere.

As a further alternative the machine might resemble the well-known disc separator used for separating grains of various shapes and sizes, except that the (vertical) discs would be smooth instead of pocketed. The discs, several of which would be mounted on a horizontal shaft, would rotate with their lower portions immersed in a bed of the mixture to be separated. Their surfaces would be moistened at a suitable point before entry into the bed and the means for dislodging the material would be provided at a higher position in the travel.

So far the process has been described as applying to separation of bran from germ, but it will be understood that it may be applied also to separation of other constituents of the grain. Thus, to some extent, detached fragments of the aleurone layer (which is the relatively colourless and low fibred innermost layer of the bran) behave similarly to germ and the process may be applied to separating them from accompanying particles of entire bran, or of the pericarp and other layers of the bran, or if desired from particles of endosperm.

According to the nature of the mixture under treatment a further separation may be effected by collecting those particles which do not adhere to the moistened surface, e. g. non-adherent endosperm particles would roll to the bottom of an inclined band.

Instead of removing particles from the moistened surface by brushing or by vibration removal can be effected, in some cases, by suction, it being understood that in such event the removed material must be separated from the air current by known means such as a cyclone separator or a filter bag.

By way of illustration the accompanying drawings show, in purely diagrammatic manner, apparatus for carrying the invention into effect, Figure 1 being a side view of one component of the multiple apparatus and Figure 2 being an end view of a multi stage apparatus.

As shown in Figure 1 $a$ is an endless band movable clockwise, over two guide rollers $b$, $b$, the mixture to be separated being allowed to fall from a feed hopper $c$ onto the lower end of the rising surface of the band $a$, while $d$ indicates means for spraying liquid against the lower end of the descending surface of the band $a$. A gentle current of air may be directed by a nozzle (not shown) in a slightly upward direction so as to impinge upon the particles falling from the feed hopper $c$. This helps in preventing particles from rolling freely down the band $a$ without having an opportunity to stick, especially when the angle of inclination of the band is steep. Near the upper end of the descending surface of the band $a$ is revolubly mounted a soft brush $e$ enclosed in a suitable housing $f$, while to contact with the descending surface of the band $a$ at a lower level is a stiff brush $g$ revolubly mounted in a suitable housing $h$. The brushes $e$ and $g$ are rotated clockwise by means not shown, and are mounted so that the distance of their spindles from the band may be varied at will. Between the levels of the brushes $e$ and $g$ the band $a$ passes through, or in close proximity to, a heater $j$. The heater $j$ may consist of an electric radiator, a steam heater, a chamber through which hot air is circulated or a similar device by which particles adhering to the band $a$ may be dried.

In use, the lower end of the descending surface of the band $a$ is moistened by spray from the device $d$, and the mixture is allowed to fall from the hopper $c$ on to the moistened surface of the lower part of the ascending side of the band $a$, and any particles (such as endosperm) which do not adhere thereto roll down and off the band $a$ and may be collected by any convenient means, not shown. At the upper end of the descending surface of the band $a$ the soft brush $e$ removes the less adherent particles (e. g. bran) which are collected by any convenient means, not shown, from the housing $f$, the more adherent particles are then dried as the descending surface of the band $a$ passes the heater $j$ after which the more adherent particles are removed from the band $a$ by the stiff brush $g$ and collected by any convenient means, not shown, from the housing $h$.

The relative stiffnesses, proximity to the band and speeds of rotation of the brushes depend on the nature of the starting material and the individual characteristics of its components. For example, with a mixture containing, say, 50% of germ or other desired substance and 50% of bran or other undesired substance the soft brush $e$ should be such that approximately 50% of the adherent particles will be removed thereby. If however nearly bran-free semolina were being treated so as to separate germ therefrom as much as 98 or 99% of the adherent particles might be removed from the band by the brush $e$. The brush $g$ should be stiff enough to remove from the surface of the band $a$ substantially all the particles adherent thereto after passing the brush $e$ and if desired a scraper (not shown) may be provided for scraping from the band $a$ any particles which resist the brush $g$.

It will be understood that if the brush $e$ be replaced by a suction nozzle the current of air should be so regulated as to produce a comparable result.

As mentioned above separation is effected stage by stage, for which purpose the output removed by the brush $g$ is used as a constituent of the starting material for another component a number of such components being arranged in conjunction with one another, the choice output of one component being led to the feed hopper of a second component and the reject from the first component being led to the feed hopper of a third component, and so on.

Such a multi-stage apparatus is illustrated diagrammatically in Figure 2 in which the components of each individual portion of the apparatus bear the same reference letters as in Figure 1, but are primed to indicate that they appertain to their individual apparatus. Some other parts, which do not appear in Figure 1, are similarly primed for a like reason. To facilitate an understanding of the combined apparatus illustrated by Figure 2 it may be stated that the original starting material is fed to the central portion and the outputs from the brushes thereof are led to the feed hoppers of the two portions situated laterally adjacent thereto so that the finished choice may be discharged ultimately at one side of the combined apparatus and the finished reject at the other side.

As illustrated bands $a^1$ to $a^9$ (or corresponding portions of a single wide band) pass over guide rollers $b$, $b$ common to all and these bands (or portion) have appropriate feed hoppers $c^1$ to $c^9$, spraying devices (not shown but similarly situated to that shown at $d$, Figure 1), soft brushes $e^1$ to $e^9$, housing $f^1$ to $f^9$, stiff brushes $g^1$ to $g^9$, and housings $h^1$ to $h^9$. The soft brushes $e^1$, $e^4$, $e^5$, $e^8$ and $e^9$ are shown as mounted on one shaft $j$ and the soft brushes $e^2$, $e^3$, $e^6$ and $e^7$ on a second shaft $k$, while the stiff brushes $g^1$ to $g^9$ are all mounted on the same shaft. In addition, a feed hopper C leads to the hopper $c^1$ for the initial feed of the starting material to the apparatus.

The housings $f^1$, $f^2$, $f^3$, $f^4$, $f^5$, $f^6$, $f^7$, and $f^8$ lead by pipes $m^1$, $m^2$, $m^3$, $m^4$, $m^5$, $m^6$, $m^7$, and $m^8$ to the feed hoppers $c^3$, $c^1$, $c^5$, $c^2$, $c^7$, $c^4$, $c^9$, and $c^6$, respectively, and the housings $h^1$, $h^2$, $h^3$, $h^4$, $h^5$, $h^6$, $h^7$, and $h^9$ lead by pipes $n^1$, $n^2$, $n^3$, $n^4$, $n^5$, $n^6$, $n^7$, and $n^9$ to the feed hoppers $c^2$, $c^4$, $c^1$, $c^6$, $c^3$, $c^8$, $c^5$ and $c^7$, respectively. The housing $f^9$ has an outlet pipe $m^9$ for the delivery from the combined apparatus of the finished reject and the housing $h^8$ has an outlet pipe $n^8$ for the delivery of the finished choice.

Initially the starting material is fed to the hopper C from which it falls on to the lower end of the rising surface of the band (or section) $a^1$, the reject being removed from said band by the soft brush $e^1$ and being led to fall in a similar manner on the lower end of the rising surface of the band $a^3$ while the choice removed from the band $a^1$ by the stiff brush $g^1$ is led to fall in a similar manner on the lower end of the rising surface of the band (or section) $a^2$.

Such separation and transfer of choice and reject from one band to the two adjacent bands at opposite sides of that at which separation has taken place occurs successively in the several parts of the combined apparatus, the more choice material moving, stage by stage, to the left, Figure 2, and the more reject moving stage by stage to the right in consequence of the arrangement of the pipes leading from the housings to the feed hoppers. For example, at the same time as reject removed from the band $a^1$ is transferred to the band $a^3$ and choice removed from the band $a^1$ is transferred to the band $a^2$, choice which has been removed from the band $a^5$ is led to the feed hopper $c^3$ to mix with the reject from the band $a^1$ and reject which has been removed from the band $a^4$ is led to the feed hopper $c^2$ to mix with the choice from the band $a^1$. Similarly reject from the band $a^2$ and choice from the band $a^3$ are led to the feed hopper $c^1$ and mix with the additional starting material introduced by way of the hopper C and it is to be observed that as the material removed from each band by its brushes is divided and (except for the two bands $a^9$ and $a^8$ from which the delivery of the finished reject and finished choice take place) transferred to the two adjacent bands, the width of the band $a^1$ must be greater than that of each of the remainder and that the individual widths of the remainder of the bands must be such as to accommodate the proportions of the initial feed thus transferred to them. These proportions will depend on the constituent nature of the starting material to be separated and, in general for any number of stages, and for any ratio between finished choice and finished reject, provided the separation be similar at every stage, the required width of the middle band (i. e. the band receiving the starting material) will be given by the sum of the geometrical progression:

$$(y+l)+y(y+l)+y^2(y+l) \ldots +y^n(y+l)$$

where $y^{n+1}=x$ and $x:l$ is the ratio of the quantities of the finished choice and finished reject, $y$ is the ratio of choice to reject for each single stage, and $n$ is the number of stages on one side of the middle, so that the total number of stages is $n+l+n$.

The required widths of band for the intermediate stages are obtained from the above expression by dropping off successive terms enclosed in brackets from one or the other end of the expression until only the final terms are left, and these represent, respectively, the widths required for the extreme sections, namely $y^n(y+l)$ and $y+l$. The width of the band occupied in the first (middle) stage by the original feed is equal to $x+l$.

As a guide, in the apparatus shown in Figure 2, the feeds to the different bands, reading from left to right, will be 1:2:3:4:5:4:3:2:1, when the separation is 1:1 at each stage and the ratio of the finished choice to finished reject is 1:1, but will be 1.25:2.33:3.28:4.10:4.82:3.56:2.48:1.54:0.71 when the ratio of the finished choice to finished reject is 1:2.

In Figure 2 separate ducts for reject and choice are shown as extending from the respective housings to the predetermined feed hoppers, but in practice the pipes $m^1$ to $m^8$ would merge with the appropriate pipes $n^1$ to $n^7$ and $n^9$ just below the housings $h^1$ to $h^7$ and $h^9$.

It is to be understood that instead of using soft and stiff brushes the less and more adherent particles of material may be removed from the bands by vibration or tapping, or suitable suction nozzles may be arranged for the removal of the reject and choice materials from the bands, such materials being separated from the air currents by a filter bag or other convenient means and afterwards transferred to appropriate feed hoppers.

In some cases the moistened surface may be drawn through or under the material to be separated. If desired the moistening of the surface may be effected by passing it through a warm humid atmosphere and then, after passing therefrom, cooling it suddenly before it reaches the position where it makes contact with the material to be separated.

If desired apparatus for carrying out the method of this invention may be such as to cause two of the components of the starting material to travel in opposite directions during the repeated separation treatment by means of doubly inclined aprons receiving the separated components, by means of oppositely directed air currents influencing the two components in opposite directions, or by means of brushes, the bristles of which are arranged helically or in a similar manner, or partly by means of a worm and partly by means of an air current.

Although hereinbefore reference is made to removal of choice and reject constituents of the starting material it is to be understood that in some cases, where the composition of the starting material and the adherence of its individual constituents so permit it may be separated into more than two constituents by the use of three or more brushes or other means for detaching them from the moistened surface.

In the foregoing the invention has been described with reference to separating valuable nutrients in flour milling, but it is to be understood that it is not restricted thereto as at is applicable to the recovering or separating of constituents from a mixture of pulverulent or finely divided materials in other industries.

We claim:

1. Apparatus for separating constituents from a mixture of pulverulent or finely divided materials that have different coefficients of adhesion when damp, comprising, in combination, at least three endless bands mounted side-by-side, parallel to one another, means for driving said bands, means for damping each band surface, means for delivering pulverulent material to be separated to the damped surface of the central band, means for removing the adherent particles selectively from said central band, means for conveying the particles of greater adherence to the moistened surface of the band on one side of said central band, means for passing the constituents of lesser adherence to the moistened surface of the band on the other side of said central band, means for removing selectively the adherent particles from each of said lateral bands, means for returning the constituents of lesser adherence from said first one of the lateral surfaces to the central surface and for passing the material of greater adherence from that lateral surface to a further locality, and means for returning the constituents of greater adherence from the said other lateral band to the central band and for passing the materials of lesser adherence from the said other lateral band to yet another locality.

2. Apparatus according to claim 1, in which the said lateral bands are of lesser width than the said central band.

CHARLES ROBERT JONES.
JOHN THOMLINSON.
NORMAN LESLIE KENT.

REFERENCES CITED

The following references are of record in the file of this patent:

UNITED STATES PATENTS

| Number | Name | Date |
| --- | --- | --- |
| 661,802 | Hilleary | Nov. 13, 1900 |
| 755,016 | Koyl | Mar. 22, 1902 |
| 1,010,779 | McKay | Dec. 5, 1911 |
| 1,213,101 | Hartrampf | Jan. 16, 1917 |
| 1,448,928 | Luckenbach | Mar. 20, 1923 |
| 1,480,354 | Wardell | Jan. 8, 1924 |
| 2,114,727 | Thys | Apr. 19, 1938 |
| 2,115,107 | Hoffeld | Apr. 26, 1938 |
| 2,226,009 | Miller | Dec. 24, 1940 |
| 2,417,660 | Remick | Mar. 18, 1947 |

FOREIGN PATENTS

| Number | Country | Date |
| --- | --- | --- |
| 534,398 | France | Jan. 5, 1922 |
| 404,603 | Great Britain | Apr. 19, 1932 |

OTHER REFERENCES

Morton Laboratory Technique in Organic Chemistry, pages 161–3.

Fractional Distillation, Robinson, 2nd edition, pages 14, 15, 132.